United States Patent Office 3,704,087
Patented Nov. 28, 1972

3,704,087
ALKYLATING AGENT NEUTRALIZING DIALKYL-
AMINE FROM DIALKYLAMINOALKYL SUL-
FONE REACTIVE DYE IN CONTINUOUS ACID
RESIST PRINTING AND STEAMING
Erich Feess and Sienling Ong, Lorsbach, Taunus, Germany, assignors to Farbwerke Hoechst Aktiengesellschaft vormals Meister Lucius & Bruning, Frankfurt am Main, Germany
No Drawing. Filed Aug. 25, 1971, Ser. No. 174,925
Claims priority, application Germany, Aug. 27, 1970,
P 20 42 418.4
Int. Cl. D06p 5/00
U.S. Cl. 8—66                                          5 Claims

ABSTRACT OF THE DISCLOSURE

A process for producing resist effects by means of reactive dyestuffs under other reactive dyestuffs on flat-surface textile structures made of natural or regenerated cellulose fibrous materials wherein a printing paste is printed on the textile material in any desired order containing non-volatile organic or inorganic acids or acid salts as reserving agent, colourless organic alkylating agents and reactive dyestuffs which may be fixed according to the two-step cold-dwelling process or the two-step rapid-fixing process for reactive dyestuffs and wherein a further printing paste or padding liquor are applied in overlapping manner which contain alkalis as fixing agents and other reactive dyestuffs which cannot be fixed by the above-mentioned fixing processes or which give only low-yields, and wherein subsequently after drying the material thus treated, fixing of the dyestuffs is carried out by steaming in combination with one of the above-mentioned two-step fixing processes.

The addition of the alkylating agent in the present process binds the dialkylamine set free by the less reactive dyestuffs in the steamer and avoids its reaction with the acid reserving agents and/or the more reactive dyestuffs.

---

The new process for producing multi-colour effects by means of reactive dyestuffs having different reactive properties has the advantage of a very simple procedure, very good reproducibility and of constant colour yield. The prints obtained are distinguished by their excellent fastness properties as is usual with reactive dyestuffs. The colour yields and brightness of the shades are excellent.

The present invention relates to a process for producing multi-colour effects by means of reactive dyestuffs of different fixation properties or colour-resists by means of reactive dyestuffs under other reactive dyestuffs.

The subject of copending United States patent application Ser. No. 877,022 is a process for producing resist effects by means of reactive dyestuffs under other reactive dyestuffs on flat-surface textile structures made of natural or regenerated cellulose fibrous materials wherein a printing paste is printed on the textile material in any desired order containing non-volatile organic or inorganic acids or acid salts as reserving agent and reactive dyestuffs which may be fixed according to the two-step cold-dwelling process or the two-step rapid-fixing process for reactive dyestuffs, and wherein a further printing paste or padding liquor is applied in over-lapping manner which contains alkalis as fixing agents and other reactive dyestuffs which cannot be fixed by the above-mentioned fixing processes or which give only low yields, and wherein subsequently, after drying the material thus treated, fixing of the dyestuffs is carried out by steaming in combination with one of the above-mentioned two-step fixing processes.

The process of the invention utilizes the different fixation properties of the dyestuffs used as resists for producing resist effects, as well as for cover-printing. It is of no importance whether the resist printing paste containing the dyestuff and acid is bottom-printed and then either in a wet process or after intermediate drying a further printing paste or thickened dyestuff solution containing the less reactive dyestuff and the alkaline agent is topped or slop-padded, or whether these two steps are carried out in reverse order.

The subsequent fixing of the prints prepared as described above is carried out after drying the material in a first step by a steaming process for 2 to 15 minutes at temperatures between 98° and 180° C. depending on the textile material used. In this process, the less reactive dyestuff is fixed on those parts of the substrate where there is no over-lapping of the bottom- or cover-print by the more reactive dyestuff. At the over-lapping parts the alkali necessary for fixing the less reactive dyestuff is consumed, so that this dyestuff cannot be fixed. In the following step the more reactive dyestuff is fixed on the colour resist by means of a two-step cold-dwelling or a two-step rapid fixing process, for example the two-phase steaming or the flash-steaming method or also the infrared process. No accumulation of either dyestuff takes place on the material since the less reactive dyestuff is not fixed by the above-mentioned two-step fixing process or only in hardly perceptible amounts.

Another form of producing colour resists by means of reactive dyestuffs under other reactive dyestuffs consists in producing multi-colour effects by means of mixtures of reactive dyestuffs according to the different fixing properties as defined above. In this process mixtures of multi-colour reactive dyestuffs of different reactivity are applied by means of padding or printing on the flat-surface textile structures made of natural or regenerated cellulose materials in the presence of alkalis, one of the reactive dyestuffs at least belonging to the more reactive group and the other ones to the less reactive group, or vice-versa. Then, the material is printed in over-lapping manner with a printing paste which contains organic or inorganic acids or acid salts as reserving agents whereupon the dyestuffs are developed according to the combined fixing processes. According to this mode of operation, bottom and cover-printing may also be carried out in reverse order.

Reactive dyestuffs suitable for producing resist effects according to these two processes are for example, those of the various organic dyestuff classes which contain at least one substituent capable of reacting with the cellulose fiber, especially dyestuffs of the anthraquinone, azo and phthalocyanine series; those of the azo and phthalocyanine series may contain metal or may be free from metal.

Reactive groups in those dyestuffs which can be fixed on the cellulose fiber by means of the two-step pad-batch or a two-step rapid-fixing process are, for example the β-sulphato-ethyl-sulphone and the N-alkyl ethionylamino radicals.

The reactive dyestuffs which cannot be fixed by one of the said two-step fixing processes preferably consist of compounds having β-dialkylamino-ethylsulphone or β-dialkylamino-ethylsulphonyl-N-alkylamino groups as the group having affinity for the fiber.

The above-mentioned processes for preparing resist effects, however, are only suitable for producing slight amounts of colour resists. When producing larger amounts of colour resists the yield and colour intensity of the more reactive dyestuffs on the material are reduced to an increasing rate. This decrease of colour intensity is due to the fact that gaseous dialkylamine is produced from the β-dialkylamino-ethylsulphone or β-dialkylaminoethylsulphonyl-N-alkylamino groups of those dyestuffs when fixing the less reactive dyestuffs by a steaming process at 100° to 180° C. for 2 to 15 minutes. For this reason the steaming chamber is gradually filled with gaseous dialkylamine. Part of this gaseous dialkylamine is bound as dialkylammonium salt by the organic or inorganic acids used as reserving agents, this part of the acid reserving agent thus being inappropriately used. As in the process of producing colour resists the printing pastes contain in addition to the acids used as reserving agents also reactive dyestuffs of the more reactive type with β-sulphato-ethylsulphone or N-alkyl-ethionylamino groups these dyestuffs react in the two-step fixing processes preferably with the dialkylamine split off instead of the hydroxyl group of the cellulose fiber and thus become inactive. The larger the amount passing through the steamer the more dialkyl amine is produced in the steaming chamber and the higher are the concentrations of dialkyl-ammonium salt in the resist printings. To the same degree, however, the colour yield obtained from the reactive dyestuffs of the more reactive type is reduced.

Now, it was found that the aforesaid drawbacks in the production of colour resists by means of reactive dyestuffs under other reactive dyestuffs or of multicolour effects by means of mixtures of reactive dyestuffs having different fixing properties according to the process described above in detail can be avoided when adding, according to the modes of operation hereinbefore indicated, colourless organic alkylating agents to the printing pastes which contain the acid reserving agent and the more reactive dyestuffs with β-sulphato-ethylsulphone or N-alkyl-ethionylamino groups or which contain the acid reserving agent alone.

The addition of the alkylating agent in the present process binds the dialkylamine set free by the less reactive dyestuffs in the steamer and avoids its reaction with the acid reserving agents and/or the more reactive dyestuffs. The alkylating agent used in accordance with the invention must be chosen as to its reactive power such that it reacts even more rapidly with the dialkyl amine than the more reactive dyestuff when being fixed in the two-step fixing process.

In this process the dialkyl amine set free in the steamer is recovered under the formation of the corresponding tertiary amine either by alkylation thus forming the trialkyl ammonium salt or by the addition reaction of the amine with reactive vinyl groups of the alkylating agents of the invention or with groups capable of forming these vinyl groups.

Suitable alkylating agents for this purpose are, for example:

Dialkyl sulphates, alkyl bromides, alkyl iodides as well as colourless organic compounds containing

or NaO$_3$S—O—CH$_2$—CH$_2$—SO$_2$— groups bound by nitrogen or colourless organic compounds of aliphatic, aromatic, cycloaliphatic or heterocyclic nature containing H$_2$C=CH—SO$_2$—, NaO$_3$S—O—CH$_2$—CH$_2$—SO$_2$—, H$_2$C=CH—CO— or NaO$_3$S—O—CH$_2$—CH$_2$—CO— groups.

Thus, the addition of alkylating agents in accordance with the invention protects the reactive dyestuffs of the more reactive type from the undesired inactivation and thus avoids almost completely a decrease of the colour yield or colour intensity of the resist printings prepared by means of these dyestuffs.

For the production of the resist goods in accordance with the invention, the same dyestuff classes, acid reserving agents, printing and fixing auxiliaries are used as in the patent application Ser. No. 877,022. Fixing of the dyestuffs applied on the textile material is also carried out in an analogous manner.

The new processes for producing multi-colour effects by means of reactive dyestuffs having different reactive properties have the advantage of a very simple procedure, very good reproducibility and of constant colour yield. The prints obtained are distinguished by their excellent fastness properties as is usual with reactive dyestuffs. The colour yields and brightness of the shades are excellent.

The following examples illustrate the invention; the parts and percentages being by weight unless otherwise stated.

EXAMPLE 1

A printing dyestuff was prepared having the following composition:

30 g. of the reactive dyestuff of the formula (U.S. Pat. No. 2,670,265)

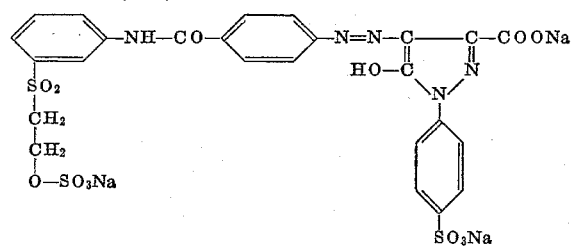

10 g. of the sodium salt of m-nitrobenzene sulphonic acid
100 g. of a 50% aqueous solution of tartaric acid
500 g. of a thickening of 6 parts of hydroxyethylcellulose in 100 parts of water
50 g. of an alkylating agent of the formula

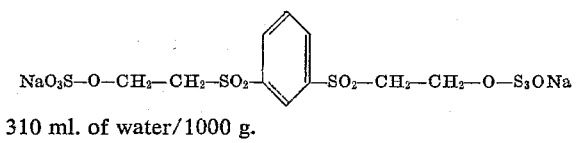

310 ml. of water/1000 g.

The resist printing dyestuff so obtained was roller-printed on a mercerized cotton fabric by means of an engraved printing roller. In the same operation this bottom-print resist was squeezed in a wet process by means of a printing roller having no engravings, and while still wet was cover-printed by means of an engraved padding roller with a further printing paste prepared as follows:

40 g. of the reactive dyestuff of the formula (British Pat. No. 898,094)

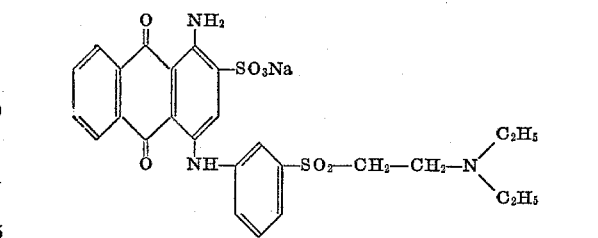

10 g. of anhydrous sodium carbonate
350 g. of thickening of 10 parts of sodium alginate in 100 parts of water
10 g. of the sodium salt of m-nitrobenzene sulphonic acid
590 ml. of water/1000 g.

After printing and drying carefully, the material was steamed for 5 minutes at 102° C. in a rapid-steamer and subsequently padded on a two-roller pad with an alkaline fixing liquor containing electrolytes, which was prepared as follows:

120 parts of anhydrous sodium sulphate, 150 parts of anhydrous sodium bicarbonate and 50 parts of potassium carbonate were dissolved in 600 parts of water. Subsequently, 100 parts by volume of sodium hydroxide solution of 38° Bé. were added. This solution was made up to 1000 parts by volume by adding water.

The material thus treated was now allowed to remain for 3 hours at room temperature in order to fix the dyestuff.

After this resting period the printed material was rinsed, as is usual in two-step printing, first for 10 minutes with cold water until the bath has a neutral reaction, treated for 3 minutes by means of hot water containing 3 parts per 1000 parts by volume of a complex-forming agent based on a polymeric sodium phosphate, subsequently soaped for 10 minutes by means of a 1% aqueous solution of a synthetic detergent (sodium salt of the condensation product of oleic acid and N-methyltaurine), then rinsed and dried.

Brilliant yiellow resists under a blue ground were obtained.

EXAMPLE 2

A fabric of cellulose fibers was padded by means of a padding liquor prepared as follows:
20 g. of the reactive dyestuff of the formula (U.S. Pat. No. 2,670,265)

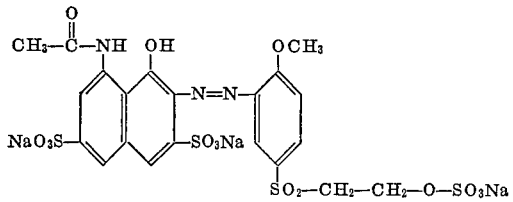

20 g. of the reactive dyestuff of the formula (British Pat. No. 898,094)

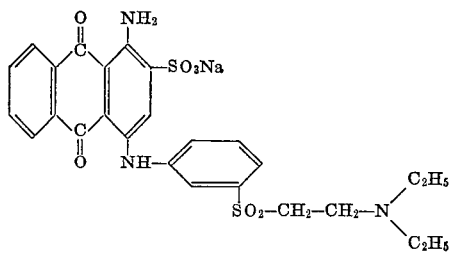

30 g. of urea
30 g. of sodium bicarbonate
300 g. of a thickening of 4 parts of alginate in 100 parts of water
600 ml. of water/1000 g.

The padded fabric was then carefully dried.

Subsequently, the material was printed with a printing paste having the following composition:

200 g. of tartaric acid
500 g. of a thickening of 6 parts of hydroxyethylcellulose in 100 parts of water
20 g. of an alkylating agent of the formula NaO$_3$S—O—CH$_2$—CH$_2$—SO$_2$—CH$_2$—CH$_2$—O—SO$_3$Na 280 ml. of water/1000 g.

The material was then dried, steamed for 3 minutes at 101°–103° C. and slop-padded with a liquor prepared as follows:

200 ml. of sodium hydroxide solution of 38° Bé.
150 g. of anhydrous sodium sulphate
650 ml. of water/1000 ml.

Subsequently, the printed material rolled up was allowed to remain for 3 hours at room temperature. Then, the material was rinsed, washed and dried as usual. A red printing design under a violet ground was obtained.

What we claim is:

1. In a continuous pad-steam process for producing resist effects on a textile material of natural or regenerated cellulose fibers by a first reactive dyestuff that can be fixed by applying an acid-binding agent to said textile material after applying said dyestuff thereto and a second reactive dyestuff that cannot be fixed by said acid-binding agent, wherein said textile material is printed with a printing paste containing a non-volatile organic acid, inorganic acid or salt thereof as a resist, said first reactive dyestuff having a beta-sulfatoethyl-sulfone reactive group is printed or padded onto said textile material and said second reactive dyestuff having a beta-dialkylamino-ethyl-sulfone or beta-dialkylamino-ethylsulfonyl-N-alkylamine reactive group is printed or padded onto said textile material together with an alkali fixing agent, the improvement which comprises adding to said printing paste containing said acid resist a colorless organic cellulose alkylating agent for alkylating dialkylamino groups liberated from said second reactive dyestuff.

2. A process according to claim 1 wherein said first reactive dyestuff is in said printing paste containing said acid resist, and said printing paste is first printed onto said textile material and thereafter said second reactive dyestuff is printed or padded onto said textile material.

3. A process according to claim 1 wherein said first and said second reactive dyestuffs are together in the same printing paste or padding liquor and printed or padded therewith onto said textile material after which said printing paste containing said acid resist is printed onto said textile material.

4. A process according to claim 1 wherein said alkylating agent is

NaO$_3$S—O—CH$_2$—CH$_2$—SO$_2$—CH$_2$—CH$_2$—O—SO$_3$Na

5. A process according to claim 1 wherein said alkylating agent is

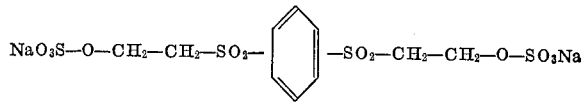

References Cited
UNITED STATES PATENTS

| 3,220,793 | 1/1965 | Parsons et al. | 8—14 |
| 3,066,005 | 1/1962 | Wedemeyer | 8—17 |
| 3,512,916 | 5/1970 | Freyermuth et al. | 8—17 X |

DONALD LEVY, Primary Examiner

U.S. Cl. X.R.
8—25